(12) United States Patent
Bandera et al.

(10) Patent No.: US 10,839,428 B2
(45) Date of Patent: Nov. 17, 2020

(54) USAGE-BASED HARDWARE OR SOFTWARE UPGRADES

(71) Applicant: International Business Machines Corporation, Armonk, NY (US)

(72) Inventors: Deborah H. Bandera, Austin, TX (US); Sara C. Brumfield, Austin, TX (US); Paula Springstead, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 865 days.

(21) Appl. No.: 14/684,349

(22) Filed: Apr. 11, 2015

(65) Prior Publication Data

US 2016/0300269 A1 Oct. 13, 2016

(51) Int. Cl.
| | |
|---|---|
| G06Q 30/02 | (2012.01) |
| G06F 8/65 | (2018.01) |
| G06Q 30/00 | (2012.01) |
| G06F 8/71 | (2018.01) |

(52) U.S. Cl.
CPC .......... *G06Q 30/0269* (2013.01); *G06F 8/65* (2013.01); *G06F 8/71* (2013.01); *G06Q 30/016* (2013.01)

(58) Field of Classification Search
None
See application file for complete search history.

(56) References Cited

U.S. PATENT DOCUMENTS

| | | | |
|---|---|---|---|
| 6,970,832 B1 * | 11/2005 | Dean | G06Q 30/0235 705/14.35 |
| 7,225,139 B1 * | 5/2007 | Tidwell | G06Q 10/10 705/7.15 |
| 8,015,114 B1 | 9/2011 | Nachenberg | |
| 8,713,525 B2 | 4/2014 | Attalla | |

(Continued)

OTHER PUBLICATIONS

Mockus et. al., Predictors of Customer Perceived Software Quality, Dec. 19, 2005, IEEE (Year: 2005).*

(Continued)

*Primary Examiner* — Abhishek Vyas
*Assistant Examiner* — Michael J Cross
(74) *Attorney, Agent, or Firm* — Robert A. Voigt, Jr.; Winstead PC

(57) ABSTRACT

A method, system and computer program product for facilitating customers to upgrade their hardware or software. An electronic problem ticketing system of a software/hardware vendor receives a request from a customer to open a problem ticket to service a designated version/model of the software/hardware product. The ticketing system acquires the number of users utilizing the software/hardware product requested to be serviced for various versions/models of the software/hardware product. A graphical diagram is generated depicting the number of users utilizing the software/hardware product requested to be serviced for various versions/models of the software/hardware product. A hyperlink to a social media website that contains information of the benefits of using a latest version or model of the software or hardware product is inserted in the graphical diagram, where after displaying such information, an instruction is received from the user to upgrade the software or hardware product.

15 Claims, 5 Drawing Sheets

(56) References Cited

U.S. PATENT DOCUMENTS

| | | | | |
|---|---|---|---|---|
| 8,903,933 | B1* | 12/2014 | Bellini, III | H04L 29/08837 |
| | | | | 707/705 |
| 2006/0126801 | A1* | 6/2006 | Laperi | G06Q 10/06 |
| | | | | 379/32.01 |
| 2006/0217111 | A1* | 9/2006 | Marolia | G06Q 30/06 |
| | | | | 455/418 |
| 2007/0116185 | A1* | 5/2007 | Savoor | H04M 3/5191 |
| | | | | 379/9 |
| 2007/0220510 | A1* | 9/2007 | Bell | G06F 8/61 |
| | | | | 717/174 |
| 2009/0138583 | A1* | 5/2009 | Childress | H04L 41/064 |
| | | | | 709/223 |
| 2010/0198879 | A1 | 8/2010 | Flores et al. | |
| 2011/0184742 | A1* | 7/2011 | Lynch | G06Q 30/02 |
| | | | | 705/1.1 |
| 2012/0117425 | A1 | 5/2012 | Lam et al. | |
| 2013/0346956 | A1* | 12/2013 | Green | G06F 8/65 |
| | | | | 717/168 |
| 2014/0108156 | A1* | 4/2014 | Hillerbrand | G06Q 50/01 |
| | | | | 705/14.66 |

OTHER PUBLICATIONS

"Fitbit Premium Membership," https://www.fitbit.com/premium/about#i.w0s96j19cneudy, 2014, pp. 1-2.

David Smith, "iOS Version Stats," http://david-smith.org/iosversonstats, Nov. 19, 2014, pp. 1-12.

Chris Mash, "Monitoring App Usage," MyOxygen, http://www.myoxygen.co.uk/blog/?p=67, Aug. 22, 2014, pp. 1-3.

* cited by examiner

USAGE-BASED HARDWARE OR SOFTWARE UPGRADES

TECHNICAL FIELD

The present invention relates generally to complex software or hardware solutions, and more particularly to encouraging customers to upgrade their hardware or software by displaying the number of peers utilizing new releases when they open an electronic problem ticket.

BACKGROUND

Currently, users (e.g., businesses, individuals) utilizing complex software or hardware are hesitant to upgrade to the latest version or model once they have established a stable environment running the complex software or hardware. It may take the user years to establish a stable environment and they do not want to risk destabilizing the environment by upgrading the software or hardware.

Such an attitude presents a problem to the software or hardware vendor in attempting to get their customers to upgrade their software or hardware to the latest version or model. Newer versions of software and hardware are being released constantly and the support organization of the vendor needs to maintain skills, environments and documentation for this growing number of releases/models, which is expensive. As a result, the software or hardware vendor has attempted to persuade the user to upgrade to the latest version or model in many different ways so as to no longer be required to support older releases/models. However, none of these methods have been effective.

For example, the vendor may announce the end of support for old versions of software and hardware in an attempt to force the user to upgrade their software or hardware to the latest version or model. However, the drawback to this solution is that it may cause customer satisfaction issues and the user may decide to pursue other options, such as using a different vendor's software or hardware.

In another example, the vendor may initiate targeted marketing, such as via e-mail, support web pages, etc., to persuade the user to upgrade based on the benefits of the newer version. However, the vendor has a difficult time in ascertaining the effectiveness of such advertising.

In a further example, the vendor may offer incentives to upgrade, such as rebates, free services, free education, etc. However, such a solution is expensive, and it may still not be enough to persuade the user to upgrade.

As a result, there is not currently a means for software or hardware vendors to effectively persuade their customers to upgrade to a later version/model.

BRIEF SUMMARY

In one embodiment of the present invention, a method for facilitating customers to upgrade their hardware or software comprises receiving a request by an electronic problem ticketing system from a user to open a problem ticket to service a designated version or model of a software or a hardware product. The method further comprises acquiring a number of users utilizing the software or hardware product for various versions or models of the software or hardware product. The method additionally comprises generating, by a processor, a graphical diagram depicting the number of users utilizing the software or hardware product for the various versions or models of the software or hardware product. Furthermore, the method comprises displaying to the user the generated graphical diagram.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
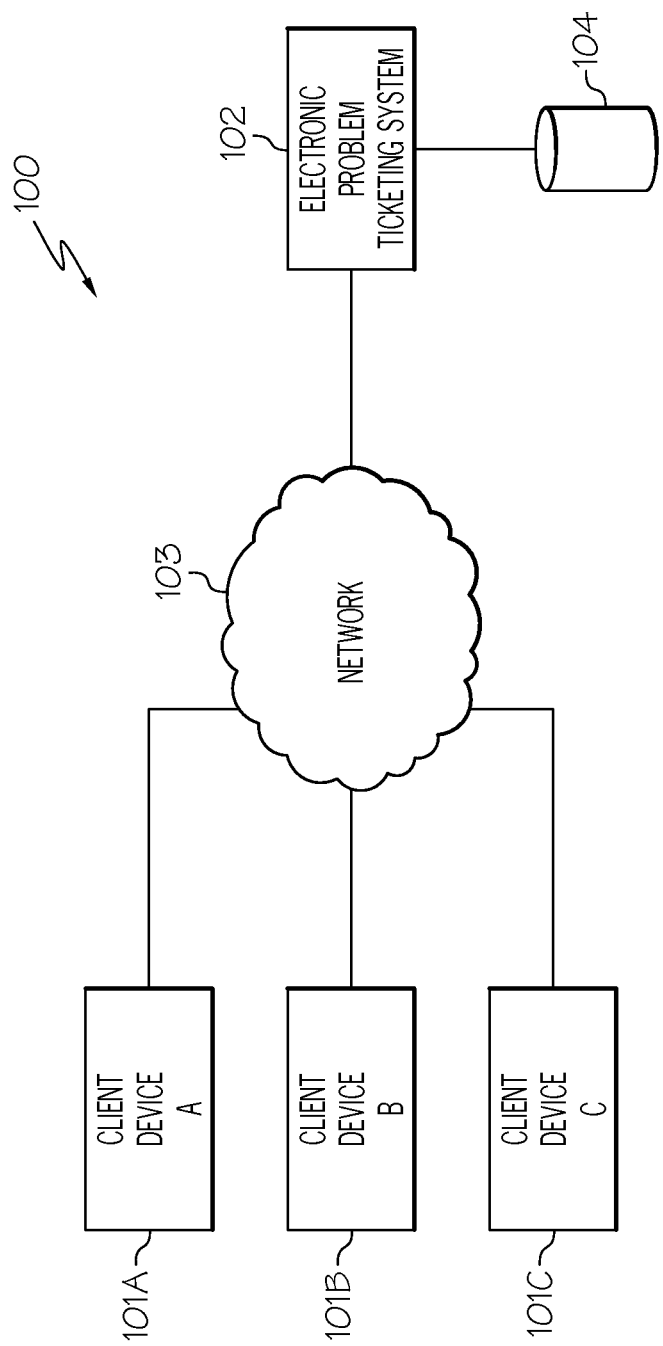
FIG. 1 illustrates a communication system configured in accordance with an embodiment of the present invention.

The present invention comprises a method, system and computer program product for encouraging customers to upgrade their hardware or software. In one embodiment of the present invention, an electronic problem ticketing system of a software or hardware vendor receives a request from a user (customer of the software or hardware vendor) to open a problem ticket to service a designated version or model of the software or hardware product. The electronic problem ticketing system acquires the number of users utilizing the software or hardware product requested to be serviced for various versions or models of the software or hardware product. A graphical diagram (e.g., bar graph, pie chart) is generated depicting the number of users utilizing the software or hardware product requested to be serviced for various versions or models of the software or hardware product. The graphical diagram is then displayed to the user, such as in the problem ticket issued by the electronic problem ticketing system. In this manner, by including such a graphical diagram, the user is encouraged to upgrade the software/hardware product requested to be serviced by subtle peer pressure (viewing the number of other users utilizing later versions or models) when the user opens an electronic problem ticket. Such an approach is more effective in persuading the vendor's customers to upgrade to a later version/model than prior approaches.

While the following discusses the present invention in connection with encouraging customers to upgrade their hardware or software product by encouraging users (who are customers of the software or hardware vendor) to upgrade their software or hardware via subtle peer pressure by displaying in graphical form the number of other users utilizing later versions or models than the version or model of the software or hardware product that is requested to be serviced, the principles of the present invention may be applied to other types of products (as well as services) where such products (or services) can be serviced via an electronic problem ticketing system. A person of ordinary skill in the art would be capable of applying the principles of the present invention to such implementations. Further, embodiments applying the principles of the present invention to such implementations would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Referring now to the Figures in detail, FIG. 1 illustrates a communication system 100 configured in accordance with an embodiment of the present invention. Referring to FIG. 1, communication system 100 includes a community of users using client devices 101A-101C (identified as "Client Device A," "Client Device B," and "Client Device C," respectively, in FIG. 1) to be involved in communication system 100. Client devices 101A-101C may collectively or individually be referred to as client devices 101 or client device 101, respectively. Client device 101 may be a portable computing unit, a Personal Digital Assistant (PDA), a smartphone, a laptop computer, a mobile phone, a navigation device, a game console, a desktop computer system, a workstation, an Internet appliance and the like. Users of client devices 101 may be a user of an enterprise (e.g., a business, a company) or an individual in a non-enterprise environment.

Client devices 101 may communicate with an electronic problem ticketing system 102 via network 103, which may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Electronic problem ticketing system 102 of a software or hardware vendor is configured to receive requests from the users of client devices 101 to issue a ticket to service the problem designated by the user for a designated software or hardware product. Electronic problem ticketing system 102 is further configured to encourage users of client devices 101 (who are customers of the software or hardware vendor) to upgrade their software or hardware via subtle peer pressure by displaying in graphical form the number of other users utilizing later versions or models of the software or hardware product that is requested to be serviced as discussed further below in connection with FIGS. 3-5. In one embodiment, electronic problem ticketing system 102 obtains the number of users utilizing later versions or models of the software or hardware product that is requested to be serviced via a database 104 connected to electronic problem ticketing system 102. In one embodiment, database 104 stores the number of users (users of client devices 101) who are currently receiving service support from the software or hardware vendor for the various versions or models of the software or hardware product. Such information may be used by electronic problem ticketing system 102 to determine the number of users utilizing later versions or models of the version or model of the software or hardware product that is requested to be serviced. A description of the hardware configuration of electronic problem ticketing system 102 is provided below in connection with FIG. 2.

System 100 is not to be limited in scope to any one particular network architecture. System 100 may include any number of client devices 101, electronic problem ticketing systems 102, networks 103 and databases 104.

Figure 2:
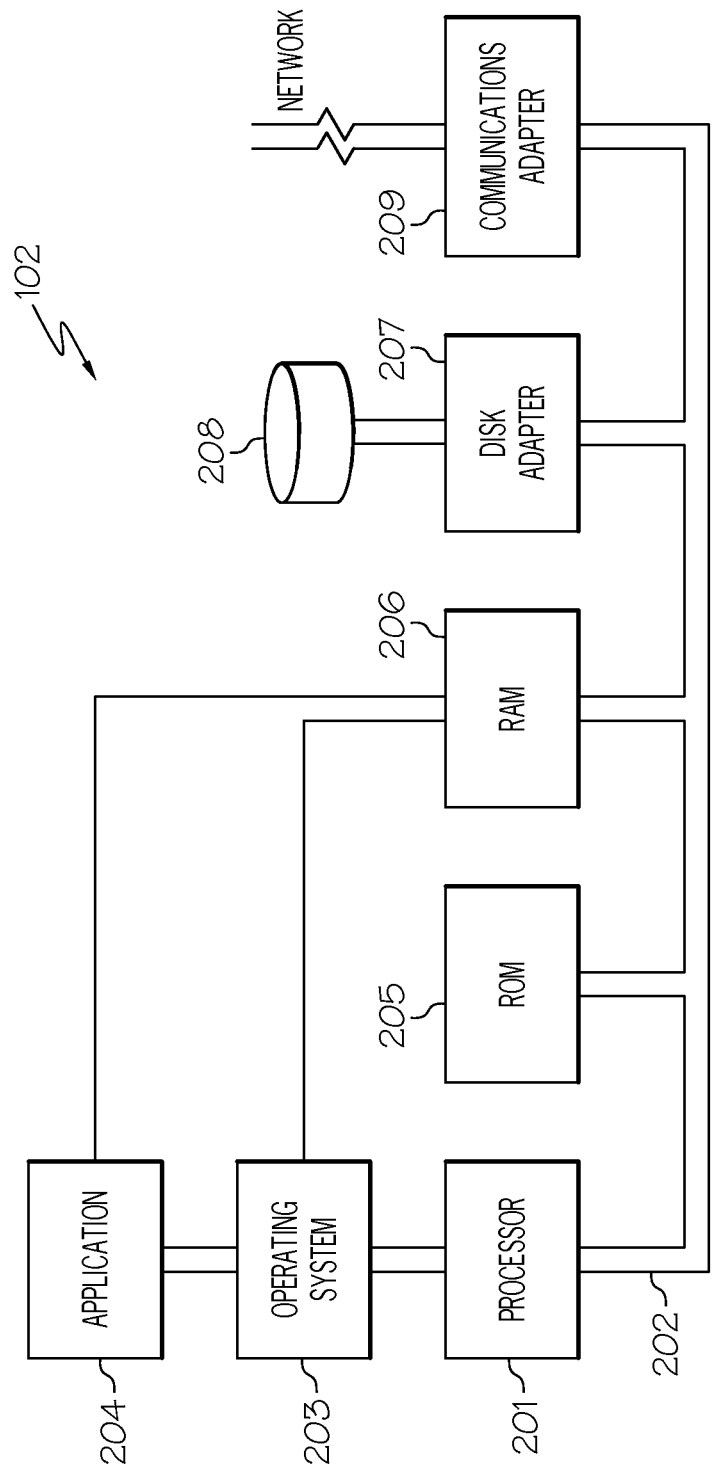
FIG. 2 illustrates a hardware configuration of an electronic problem ticketing system in accordance with an embodiment of the present invention.

Referring now to FIG. 2, FIG. 2 illustrates a hardware configuration of electronic problem ticketing system 102 (FIG. 1) which is representative of a hardware environment for practicing the present invention. Referring to FIG. 2, electronic problem ticketing system 102 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for encouraging users of client devices 101 of FIG. 1 (who are customers of the software or hardware vendor) to upgrade their software or hardware via subtle peer pressure by displaying in graphical form the number of other users utilizing later versions or models than the version or model of the software or hardware product that is requested to be serviced as discussed further below in association with FIGS. 3-5.

Referring again to FIG. 2, read-only memory ("ROM") 205 is coupled to system bus 202 and includes a basic input/output system ("BIOS") that controls certain basic functions of electronic problem ticketing system 102. Random access memory ("RAM") 206 and disk adapter 207 are also coupled to system bus 202. It should be noted that software components including operating system 203 and application 204 may be loaded into RAM 206, which may be electronic problem ticketing system's 102 main memory for execution. Disk adapter 207 may be an integrated drive electronics ("IDE") adapter that communicates with a disk unit 208, e.g., disk drive. It is noted that the program for encouraging users of client devices 101 (who are customers of the software or hardware vendor) to upgrade their software or hardware via subtle peer pressure by displaying in graphical form the number of other users utilizing later versions or models of the software or hardware product that is requested to be serviced, as discussed further below in association with FIGS. 3-5, may reside in disk unit 208 or in application 204.

Electronic problem ticketing system 102 may further include a communications adapter 209 coupled to bus 202. Communications adapter 209 interconnects bus 202 with an outside network (e.g., network 103 of FIG. 1) thereby allowing electronic problem ticketing system 102 to communicate with client devices 101.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, currently, users (e.g., businesses, individuals) utilizing complex software or hardware are hesitant to upgrade to the latest version or model once they have established a stable environment running the complex software or hardware. It may take the user years to establish a stable environment and they do not want to risk destabilizing the environment by upgrading the software or hardware. Such an attitude presents a problem to the software or hardware vendor in attempting to get their customers to upgrade their software or hardware to the latest version or model. Newer versions of software and hardware are being released constantly and the support organization of the vendor needs to maintain skills, environments and documentation for this growing number of releases/models, which is expensive. As a result, the software or hardware vendor has attempted to persuade the user to upgrade to the latest version or model in many different ways so as to no longer be required to support older releases/models. However, none of these methods have been effective. As a result, there is not currently a means for software or hardware vendors to effectively persuade their customers to upgrade to a later version/model.

Figure 3:
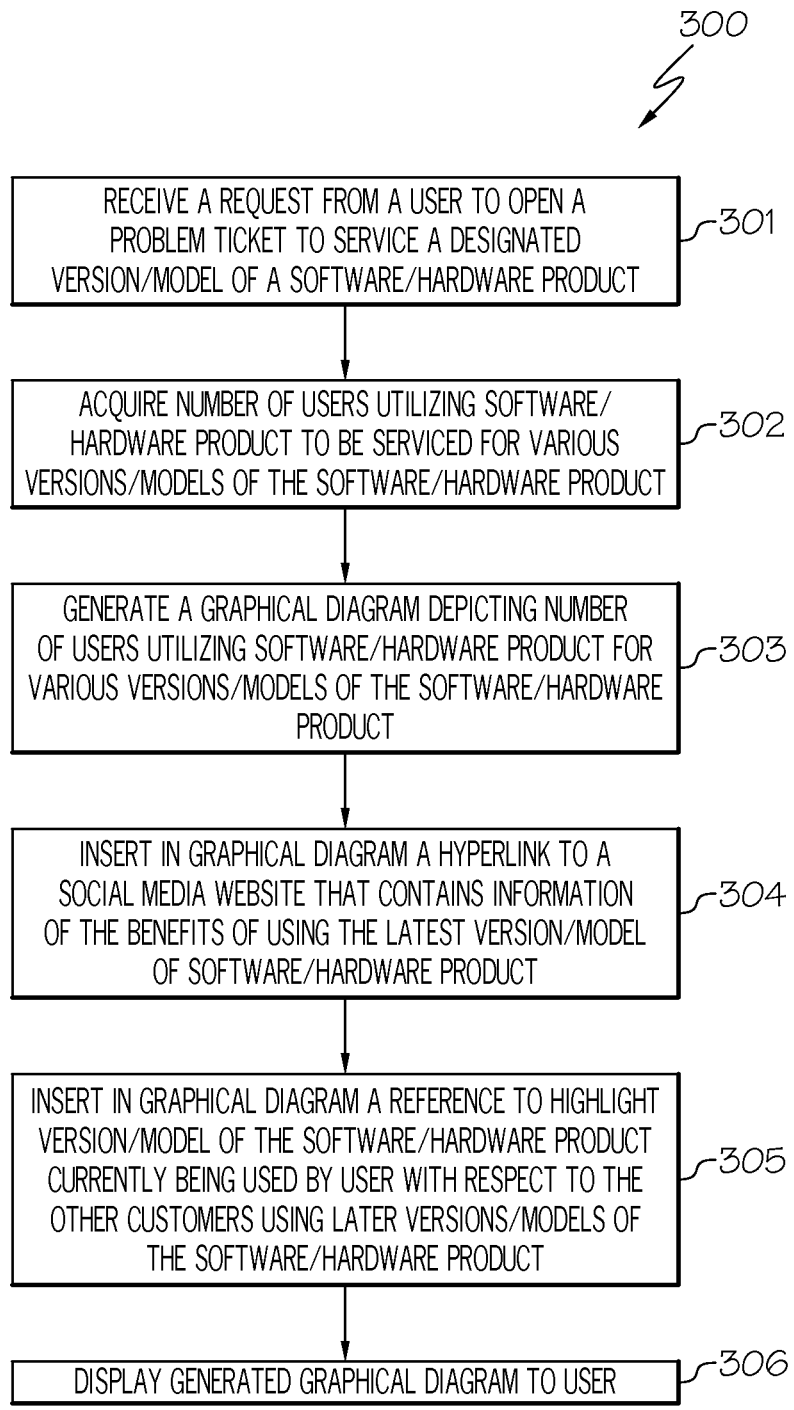
FIG. 3 is a flowchart of a method for encouraging customers to upgrade their hardware or software via subtle peer pressure by displaying in graphical form the number of other users utilizing later versions or models than the version or model of the software or hardware product that is requested to be serviced in accordance with an embodiment of the present invention.
Figure 4:
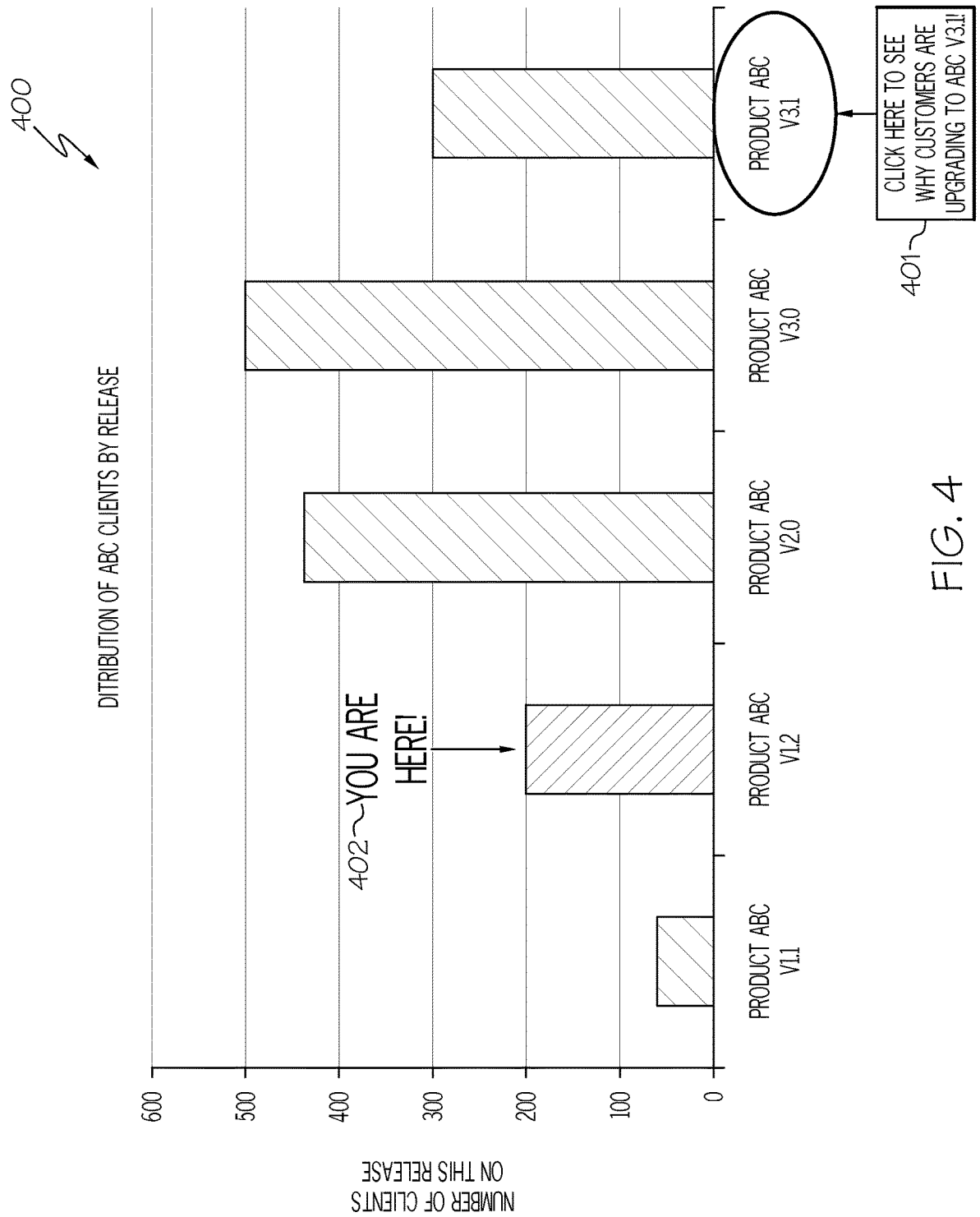
FIG. 4 illustrates a bar graph depicting the number of users utilizing the software or hardware product requested to be serviced for various versions or models of the software or hardware product in accordance with an embodiment of the present invention.
Figure 5:
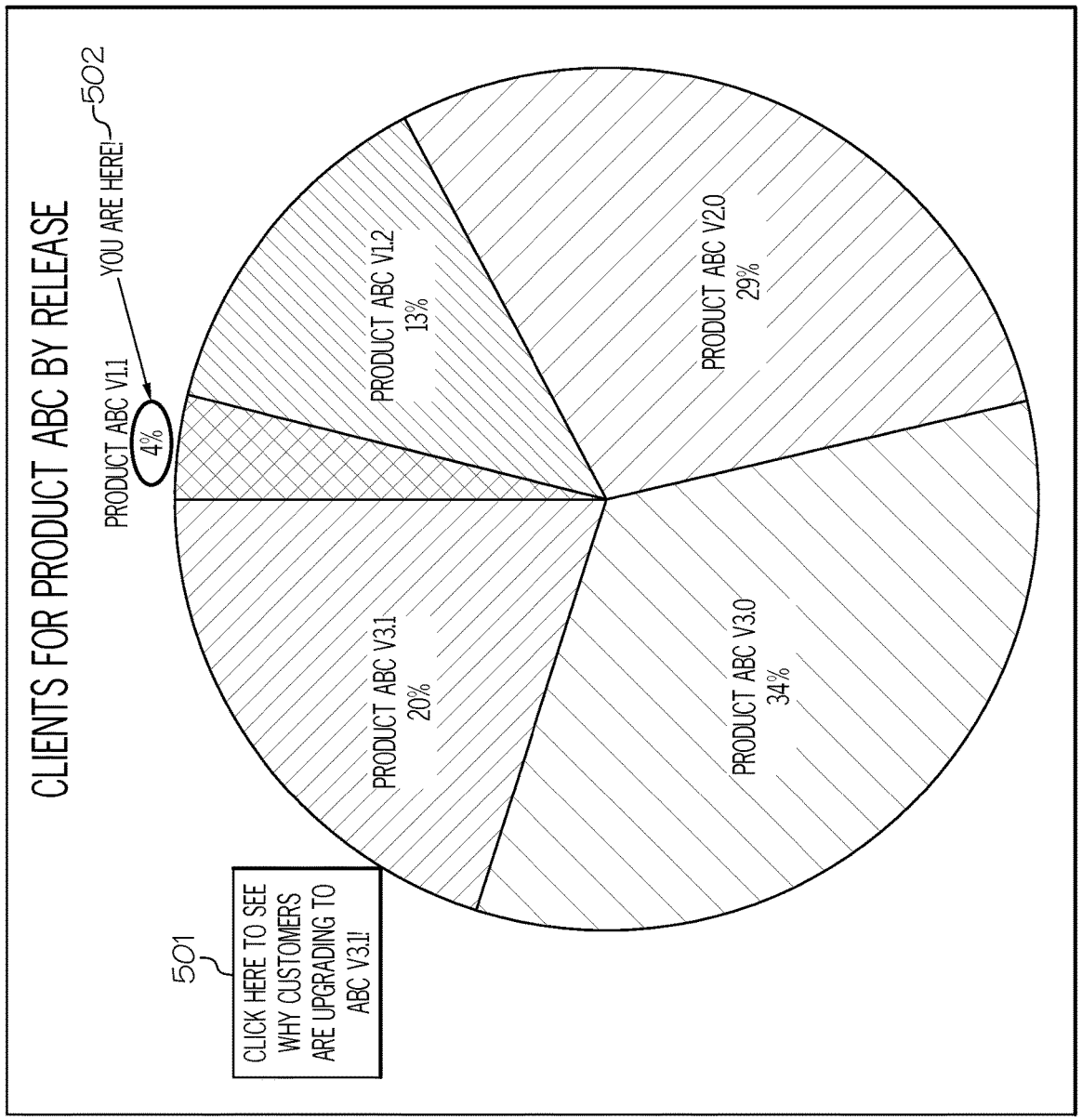
FIG. 5 illustrates a pie chart depicting the number of users utilizing the software or hardware product requested to be serviced for various versions or models of the software or hardware product in accordance with an embodiment of the present invention.

The principles of the present invention provide a means for more effectively persuading customers of a software or hardware vendor to upgrade their hardware or software by displaying to the user (customer) in graphical form the number of other users utilizing later versions or models of the software or hardware product than the version or model requested to be serviced by the user as discussed below in connection with FIGS. 3-5. FIG. 3 is a flowchart of a method for encouraging customers to upgrade their hardware or software via subtle peer pressure by displaying in graphical form the number of other users utilizing later versions or models than the version or model of the software or hardware product that is requested to be serviced. FIG. 4 illustrates a bar graph depicting the number of users utilizing the software or hardware product requested to be serviced for various versions or models of the software or hardware product. FIG. 5 illustrates a pie chart depicting the number of users utilizing the software or hardware product requested to be serviced for various versions or models of the software or hardware product.

As stated above, FIG. 3 is a flowchart of a method 300 for encouraging customers to upgrade their hardware or software via subtle peer pressure by displaying in graphical form the number of other users utilizing later versions or models than the version or model of the software or hardware product that is requested to be serviced in accordance with an embodiment of the present invention.

Referring to FIG. 3, in conjunction with FIGS. 1-2, in step 301, electronic problem ticketing system 102 of a software or hardware vendor receives a request from a user (e.g., user of client device 101A) to open a problem ticket to service a designated version or model of a software or hardware product.

In step 302, electronic problem ticketing system 102 acquires the number of users utilizing the software or hardware product requested to be serviced for various versions or models of the software or hardware product. In one embodiment, electronic problem ticketing system 102 acquires such information from database 104, which stores the number of users (e.g., users of client devices 101) who are currently receiving service support for the various versions or models of the software or hardware product requested to be serviced.

In step 303, electronic problem ticketing system 102 generates a graphical diagram depicting the number of users (e.g., users of client devices 101) utilizing the software or hardware product requested to be serviced for various versions or models of the software or hardware product. The "number of users," as used herein, includes the percentage of the users utilizing the software or hardware product as well as the actual number of the users utilizing the software or hardware product. An illustration of such a graphical diagram will be discussed further below.

In step 304, electronic problem ticketing system 102 inserts in the generated graphical diagram a hyperlink to a social media website (e.g., forum, community, Facebook® page, LinkedIn® group) that contains information about the benefits of using the latest version or model of the software or hardware product requested to be serviced.

In step 305, electronic problem ticketing system 102 inserts in the generated graphical diagram a reference to highlight the version or model of the software or hardware product currently being used by the user (the user refers to the user who requested to open a problem ticket to service a designated version or model of the software or hardware product in step 301) with respect to the other customers using later versions or models of the software or hardware product.

In step 306, electronic problem ticketing system 102 displays to the user (user requesting the software or hardware product to be serviced) the generated graphical diagram. In one embodiment, the generated graphical diagram is displayed in the problem ticket issued by electronic problem ticketing system 102.

An illustration of such a generated graphical diagram that includes the embedded hyperlink of step 304 and the reference of step 305 is shown in FIG. 4.

FIG. 4 illustrates a bar graph 400 depicting the number of users utilizing the software or hardware product requested to be serviced for various versions or models of the software or hardware product in accordance with an embodiment of the present invention.

Referring to FIG. 4, in conjunction with FIG. 3, bar graph 400 depicts the number of users utilizing the software/hardware product ABC that is requested to be serviced by the user in step 301 for various versions. For example, bar graph 400 depicts the number of users utilizing version 1.1, version 1.2, version 2.0, version 3.0 and version 3.1 of the software/hardware product ABC. By including a representation of the number of other users who are utilizing later versions than the version of the software/hardware product requested to be serviced by the user, the user is encouraged to upgrade the software/hardware product requested to be serviced by peer pressure when the user opens an electronic problem ticket. Peer pressure may be achieved by viewing the number of other users, including competitors, who are using a later version. For example, the user may be motivated to upgrade the version or model of the software or hardware product in order to remain competitive with the user's competitors. An advantage of such an approach is that the vendor is assured that the marketing messages are reaching active customers and with the addition of information regarding the number of other users who are using a later version, there is subtle peer pressure applied to the customer to upgrade that was previously lagging in current approaches.

As also illustrated in FIG. 4, an embedded hyperlink 401 for the latest version (version 3.1) of the software/hardware product ABC is provided whereby the user can select such a hyperlink 401 to a social media website (e.g., forum, community, Facebook® page, LinkedIn® group) that contains information about the benefits of using the latest version or model of the software or hardware product requested to be serviced. Such benefits may be advocated by other customers who may provide subtle peer pressure for the user to upgrade the version or model of the software or hardware product the user is currently using. In this manner, the user can be further encouraged to upgrade the software or hardware product requested to be serviced. Furthermore, as discussed above, by embedding hyperlink 401 in bar graph 400 that is displayed to the user (user requesting the software or hardware product to be serviced), the vendor is assured that the marketing messages are reaching active customers.

Furthermore, as illustrated in FIG. 4, a reference 402 (identified by "You are here!" in FIG. 4) is inserted in bar graph 400 to highlight the version or model of the software or hardware product currently being used by the customer requesting the software or hardware product to be serviced with respect to the other customers using later versions or models of the software or hardware product. Such a reference 402 assists in providing subtle psychological pressure to the customer to upgrade the software or hardware product since others are using later versions or models.

An alternative graphical diagram is discussed below in connection with FIG. 5.

FIG. 5 illustrates a pie chart 500 depicting the number of users utilizing the software or hardware product requested to be serviced for various versions or models of the software or hardware product in accordance with an embodiment of the present invention.

Referring to FIG. 5, in conjunction with FIG. 3, pie chart 500 depicts the number of users in percentages utilizing the software/hardware product ABC that is requested to be serviced by the user in step 301 for various versions. When the number of users utilizing a software or hardware product that is requested to be serviced is discussed herein, it inherently includes a percentage representation of those users utilizing the software or hardware product.

As illustrated in pie chart 500, pie chart 500 illustrates the percentage of users utilizing version 1.1, version 1.2, version 2.0, version 3.0 and version 3.1 of the software/hardware product ABC. By including a representation of the percentage of other users who are utilizing later versions than the version of the software/hardware product requested to be serviced by the user, the user is encouraged to upgrade the software/hardware product requested to be serviced by peer pressure when the user opens an electronic problem ticket. Peer pressure may be achieved by viewing the percentage of other users, including competitors, who are using a later version. As discussed above, an advantage of such an approach is that the vendor is assured that the marketing messages are reaching active customers and with the addition of information regarding the percentage of other users who are using a later version, there is subtle peer pressure applied to the customer to upgrade that was previously lagging in current approaches.

As also illustrated in FIG. 5, an embedded hyperlink 501 for the latest version (version 3.1) of the software/hardware product ABC is provided whereby the user can select such a hyperlink 501 to a social media website (e.g., forum, community, Facebook® page, LinkedIn® group) that contains information about the benefits of using the latest version or model of the software or hardware product requested to be serviced. Such benefits may be advocated by other customers who may provide subtle peer pressure for the user to upgrade the version or model of the software or hardware product the user is currently using. In this manner, the user can be further encouraged to upgrade the software or hardware product requested to be serviced. Furthermore, as discussed above, by embedding hyperlink 501 in pie chart 500 that is displayed to the user (user requesting the software or hardware product to be serviced), the vendor is assured that the marketing messages are reaching active customers.

Furthermore, as illustrated in FIG. 5, a reference 502 (identified by "You are here!" in FIG. 5) is inserted in pie chart 500 to highlight the version or model of the software or hardware product currently being used by the customer requesting the software or hardware product to be serviced with respect to the other customers using later versions or models of the software or hardware product. Such a reference 502 assists in providing subtle psychological pressure to the customer to upgrade the software or hardware product since others are using later versions or models.

In one embodiment, the graphical diagrams discussed above can be shown to the customer each time the customer opens an electronic problem ticket for the software or hardware product. In this manner, the customer will continue to visually see how other users are utilizing later versions or models of the software or hardware product. Over time, with each new problem ticket opened, the customer will see the number of users utilizing older versions or models to dwindle thereby providing further subtle psychological pressure to follow the crowd and upgrade.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for facilitating customers to upgrade their hardware or software, the method comprising:

receiving a request by an electronic problem ticketing system from a user to open a problem ticket to service a designated version or model of a software or a hardware product;

acquiring, by said electronic problem ticketing system, a number of users utilizing said software or hardware product for various versions or models of said software or hardware product;

generating, by said electronic problem ticketing system, a graphical diagram depicting said number of users utilizing said software or hardware product for said various versions or models of said software or hardware product, wherein said graphical diagram further depicts users utilizing a later version or model of said software or hardware product than said user, wherein by said graphical diagram depicting users utilizing a later version or model of said software or hardware product than said user, said user is facilitated to upgrade said software or hardware product;

inserting, by said electronic problem ticketing system, in said graphical diagram a hyperlink to a social media website that contains information of the benefits of using a latest version or model of said software or hardware product;

inserting, by said electronic problem ticketing system, in said graphical diagram a reference to highlight said designated version or model of said software or hardware product currently being used by said user with respect to other users using later versions or models of said software or hardware product;

displaying, by said electronic problem ticketing system, to said user said generated graphical diagram in response to said user opening said problem ticket;

further displaying, by said electronic problem ticking system, said generated graphical diagram to said user to facilitate an upgrade to said software or hardware product in response to said user opening additional problem tickets to service said designated version or model of said software or hardware product;

receiving, by said electronic problem ticketing system, a selection of said hyperlink to said social media website that contains information of the benefits of using said latest version or model of said software or hardware product, wherein by providing information of the benefits of using said latest version or model of said software or hardware product, said user is facilitated to upgrade said software or hardware product;

displaying said information of the benefits of using said latest version or model of said software or hardware product to a computing device of said user; and receiving an instruction to upgrade said software or hardware product from said user.

2. The method as recited in claim 1, wherein said generated graphical diagram is displayed in said problem ticket issued by said electronic problem ticketing system.

3. The method as recited in claim 1, wherein said generated graphical diagram is a bar graph.

4. The method as recited in claim 1, wherein said generated graphical diagram is a pie chart.

5. The method as recited in claim 1, wherein said number of users utilizing said software or hardware product for said various versions or models of said software or hardware product is acquired via a database storing a number of users currently receiving service support for said various versions or models of said software or hardware product.

6. A computer program product for facilitating customers to upgrade their hardware or software, the computer program product comprising a non-transitory computer readable storage medium having program code embodied therewith, the program code comprising the programming instructions for:

receiving a request by an electronic problem ticketing system from a user to open a problem ticket to service a designated version or model of a software or a hardware product;

acquiring, by said electronic problem ticketing system, a number of users utilizing said software or hardware product for various versions or models of said software or hardware product;

generating, by said electronic problem ticketing system, a graphical diagram depicting said number of users utilizing said software or hardware product for said various versions or models of said software or hardware product, wherein said graphical diagram further depicts users utilizing a later version or model of said software or hardware product than said user; wherein by said graphical diagram depicting users utilizing a later version or model of said software or hardware product than said user, said user is facilitated to upgrade said software or hardware product;

inserting, by said electronic problem ticketing system, in said graphical diagram a hyperlink to a social media website that contains information of the benefits of using a latest version or model of said software or hardware product;

inserting, by said electronic problem ticketing system, in said graphical diagram a reference to highlight said designated version or model of said software or hardware product currently being used by said user with respect to other users using later versions or models of said software or hardware product;

displaying, by said electronic problem ticketing system, to said user said generated graphical diagram in response to said user opening said problem ticket;

further displaying, by said electronic problem ticking system, said generated graphical diagram to said user to facilitate an upgrade to said software or hardware product in response to said user opening additional problem tickets to service said designated version or model of said software or hardware product;

receiving, by said electronic problem ticketing system, a selection of said hyperlink to said social media website that contains information of the benefits of using said latest version or model of said software or hardware product, wherein by providing information of the benefits of using said latest version or model of said software or hardware product, said user is facilitated to upgrade said software or hardware product by peer pressure;

displaying said information of the benefits of using said latest version or model of said software or hardware product to a computing device of said user; and receiving an instruction to upgrade said software or hardware product from said user.

7. The computer program product as recited in claim 6, wherein said generated graphical diagram is displayed in said problem ticket issued by said electronic problem ticketing system.

8. The computer program product as recited in claim 6, wherein said generated graphical diagram is a bar graph.

9. The computer program product as recited in claim 6, wherein said generated graphical diagram is a pie chart.

10. The computer program product as recited in claim 6, wherein said number of users utilizing said software or hardware product for said various versions or models of said software or hardware product is acquired via a database storing a number of users currently receiving service support for said various versions or models of said software or hardware product.

11. An electronic problem ticketing system, comprising:
a memory unit for storing a computer program for facilitating customers to upgrade their hardware or software; and
a processor coupled to the memory unit, wherein the processor is configured to execute the program instructions of the computer program comprising:
receiving a request from a user to open a problem ticket to service a designated version or model of a software or a hardware product;
acquiring a number of users utilizing said software or hardware product for various versions or models of said software or hardware product;
generating a graphical diagram depicting said number of users utilizing said software or hardware product for said various versions or models of said software or hardware product, wherein said graphical diagram further depicts users utilizing a later version or model of said software or hardware product than said user, wherein by said graphical diagram depicting users utilizing a later version or model of said software or hardware product than said user, said user is facilitated to upgrade said software or hardware product;

inserting in said graphical diagram a hyperlink to a social media website that contains information of the benefits of using a latest version or model of said software or hardware product;

inserting in said graphical diagram a reference to highlight said designated version or model of said software or hardware product currently being used by said user with respect to other users using later versions or models of said software or hardware product;

displaying to said user said generated graphical diagram in response to said user opening said problem ticket;

further displaying said generated graphical diagram to said user to facilitate an upgrade to said software or hardware product in response to said user opening additional problem tickets to service said designated version or model of said software or hardware product;

receiving a selection of said hyperlink to said social media website that contains information of the benefits of using said latest version or model of said software or hardware product, wherein by providing information of the benefits of using said latest version or model of said software or hardware product, said user is facilitated to upgrade said software or hardware product;

displaying said information of the benefits of using said latest version or model of said software or hardware product to a computing device of said user; and receiving an instruction to upgrade said software or hardware product from said user.

12. The electronic problem ticketing system as recited in claim 11, wherein said generated graphical diagram is displayed in said problem ticket issued by said electronic problem ticketing system.

13. The electronic problem ticketing system as recited in claim 11, wherein said generated graphical diagram is a bar graph.

14. The electronic problem ticketing system as recited in claim 11, wherein said generated graphical diagram is a pie chart.

15. The electronic problem ticketing system as recited in claim 11, wherein said number of users utilizing said software or hardware product for said various versions or models of said software or hardware product is acquired via a database storing a number of users currently receiving service support for said various versions or models of said software or hardware product.

* * * * *